No. 753,105. PATENTED FEB. 23, 1904.
A. & J. PHILLIPS.
COFFEE URN.
APPLICATION FILED JUNE 11, 1901. RENEWED DEC. 29, 1903.
NO MODEL.

Witnesses:
J. Sprigg Poole
Walter Allen

Inventors:
Alexander Phillips,
and John Phillips
by Herbert W. T. Jenner.
Attorney No. 753,105.

Patented February 23, 1904.

UNITED STATES PATENT OFFICE.

ALEXANDER PHILLIPS AND JOHN PHILLIPS, OF GLASGOW, SCOTLAND.

COFFEE-URN.

SPECIFICATION forming part of Letters Patent No. 753,105, dated February 23, 1904.

Application filed June 11, 1901. Renewed December 29, 1903. Serial No. 187,069. (No model.)

*To all whom it may concern:*

Be it known that we, ALEXANDER PHILLIPS and JOHN PHILLIPS, citizens of the United Kingdom of Great Britain and Ireland, residing at 17 Anderston Quay, Glasgow, Scotland, have invented certain new and useful Improvements in Coffee-Urns, (which have been patented in Great Britain, No. 20,420, dated November 13, 1900,) of which the following is a specification.

The invention, which is to be hereinafter described in all its essential details, relates to coffee-urns for use on board ships, in hotels, restaurants, and the like and which is also applicable for domestic use, and has for its object the production of a coffee-urn by which the flavor is completely extracted from the ground coffee without the necessity of boiling the ground coffee in the water, as is ordinarily and erroneously practiced.

Figure 1:
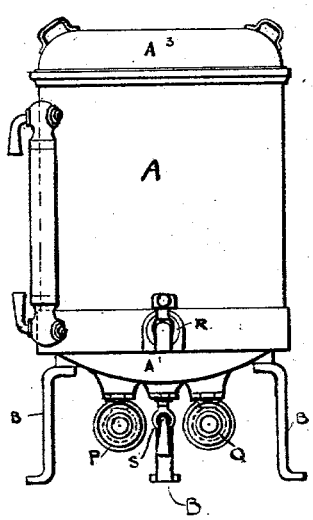
Figure 2:
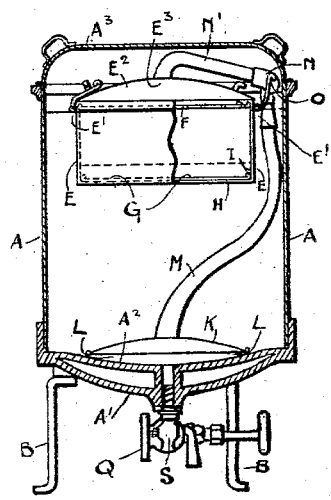
Figure 3:
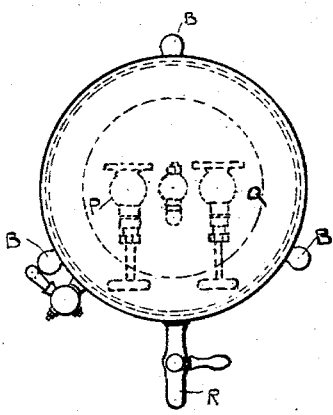
Figure 4:
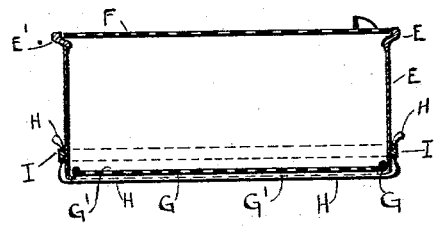

Figure 1 of the appended drawings is an outside elevation, Fig. 2 a vertical section, Fig. 3 a plan view, of the improved coffee-urn. Fig. 4 is a detail of the coffee percolator or container E drawn to a larger scale.

In making a coffee-urn in accordance with our invention we make the cylindrical outer casing A with a steam-jacketed bottom A', this bottom A' having feet B, which support the casing slightly above the ground and admit of certain accessories, hereinafter described, being attached to the under side A' of the casing A. A portion of the inner face of this steam-jacketed bottom A' from the center outward is made concave, as shown at $A^2$, for a purpose hereinafter described, and the upper open end of the casing A is fitted with a cover $A^3$, portions of which are arranged to engage snug on the upper end of the casing A, so that by slightly turning the cover $A^3$ the latter is locked steam-tight upon the upper edge of the casing A.

E is a cylindrical inner casing or receptacle (technically termed a "percolator") open at the top and having a wire-gauze bottom G secured to it and a removable sieve G' placed within said receptacle and resting on said bottom. This receptacle E is closed at the top first by a removable perforated cover F and above this cover F by a removable cover $E^2$, clamped to the receptacle E and having a central orifice $E^3$, hereinafter referred to. On the outside of the wire-gauze bottom G a muslin cloth H is stretched and secured upon the circumference of the receptacle E by a sliding ring I thereon. The receptacle E is supported by its flanges E' in the upper part of the casing A in any approved manner.

Over the concave portion $A^2$ of the bottom A' of the casing A and just clear thereof an inverted concave plate K is fitted, so that the space L, inclosed by the concave portion $A^2$ and the inverted concave plate K, is convex on both top and bottom, and from this plate K a vertical slightly-bent pipe M is led upward, tapering slightly toward the upper end. The pipe M is connected to the casing N of a two-way cock O, which casing N is secured to the casing A. The pipe M suspends the concavo-convex plate K in the casing A, so that its periphery is just clear of the bottom of the said casing. To this cock O is fixed a bent pipe N' normally horizontal, but adapted to turn with said cock O in such wise that the water-passage in the cock O, which normally connects the pipes M and N', can close off the connection between these pipes.

In the improved urn coffee is produced in the following manner: Water is filled into the outer casing A until it reaches within a short distance of the coffee holder or receptacle E. A quantity of ground coffee is then placed in the receptacle E, the perforated cover F placed upon said receptacle, the outer cover $E^2$ clamped thereto, and the outer free end of the movable horizontal pipe N' brought over said orifice $E^3$ in the cover $E^2$. The cover $A^3$ of the outer casing A is then shut down and locked steam-tight to said casing A, steam in circulation being admitted to steam-space between the jacket A' and the bottom proper, $A^2$, of the casing A, inlet and outlet valves P Q being provided on the bottom of the jacket A'. When the water contained in the space L is converted into steam, it rushes up the pipe M, carrying with it boiling water from the casing E and passes through the vertical pipe M and by way of the passages in the cock O along the horizontal pipe N' and in through the orifice $E^3$ in the cover $E^2$ of the receptacle E, where, striking the inner perforated cover F, it is spread over the entire surface of the ground coffee, and finally passes in among the water beneath the receptacle E. The water is thus circulated through the coffee in the receptacle E for any desired time, and when it is desired to stop said circulation this can be done either by shutting off the supply of steam to the jacket A' or by removing the cover A³ from the outer casing and turning upward the pipe N', attached to the cock O, the cock O in this position barring all passage of liquid from the vertical pipe M to the horizontal pipe N'. The coffee may then be drawn off by a cock R at the lower end of the cylindrical side of the casing A, the convex space L formed between the bottom A² and the inverted disk K retaining any sediment and allowing of the clear coffee being run off by aforesaid cock R, this sediment afterward being got rid of by opening a drain-cock S, connected through the steam-jacket A' to the concave portion A² of the casing-bottom.

What we claim is—

In a coffee-urn, the combination, with a closed casing having an outlet at its bottom, and means for heating its said bottom; of a receptacle E for coffee supported in the upper part of the casing and having a bottom G of wire-gauze, a removable sieve G' resting on the said bottom G, a removable straining-cloth H secured under the said bottom G, a removable perforated distributing-cover F supported at the upper part of the receptacle E, a top cover having a central hole over the said cover F, a bent pipe M secured to the casing on one side of the receptacle E, a bent delivery-pipe pivoted to the upper part of the pipe M and having its free end inserted in the said central hole of the top cover, and a concavo-convex plate secured to the bottom end of the pipe M with its periphery arranged a short distance above the said bottom of the casing, substantially as set forth.

In witness whereof we have hereunto set our hands in presence of two witnesses.

ALEXANDER PHILLIPS.
JOHN PHILLIPS.

Witnesses:
   JAS. SUTHERLAND, Jr.,
   JAS. CASSELS.